Figure 1:
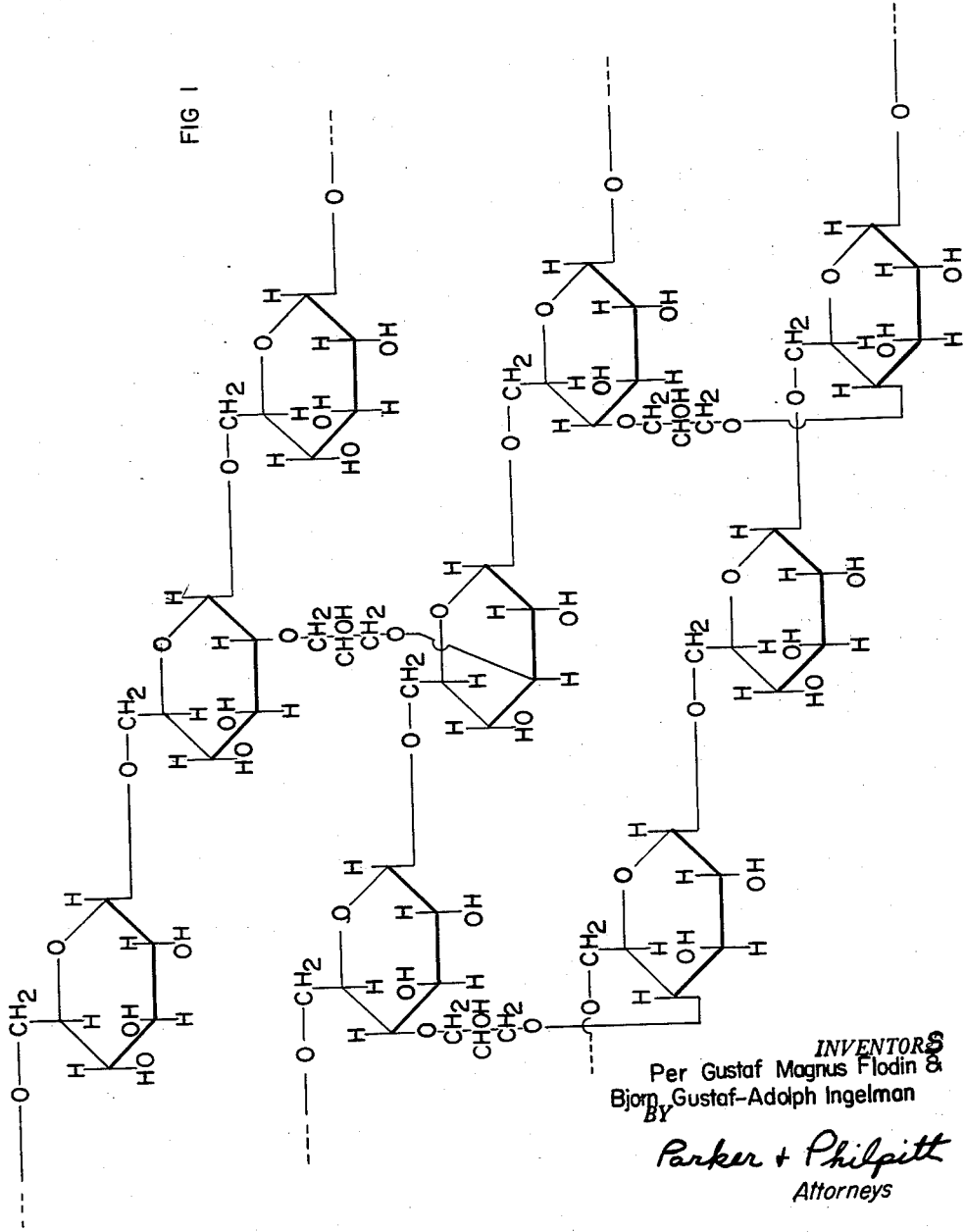

July 3, 1962

P. G. M. FLODIN ETAL 3,042,667

PROCESS FOR PRODUCING DEXTRAN DERIVATIVES
AND PRODUCTS RESULTING THEREFROM

Filed March 10, 1959

INVENTORS
Per Gustaf Magnus Flodin &
Bjorn Gustaf-Adolph Ingelman
BY

Parker + Philpitt
Attorneys

United States Patent Office 3,042,667
Patented July 3, 1962

3,042,667
PROCESS FOR PRODUCING DEXTRAN DERIVATIVES AND PRODUCTS RESULTING THEREFROM
Per Gustaf Magnus Flodin and Bjorn Gustaf-Adolf Ingelman, Uppsala, Sweden, assignors to Aktiebolaget Pharmacia, Uppsala, Sweden, a company of Sweden
Filed Mar. 10, 1959, Ser. No. 798,541
8 Claims. (Cl. 260—209)

This invention generally pertains to hydrophilic high molecular weight polymerization products of dextran substances. More particularly, this invention relates to hydrophilic high molecular weight copolymerization products obtained by reacting dextran substances with bifunctional organic substances capable of reacting with the hydroxyl groups of the dextran substances to form gel products possessing valuable properties for a number of different uses and especially useful for separating substances of different molecular dimensions by so-called "molecular sieving." This invention also encompasses the process for the manufacture of such copolymerizates.

THE INVESTMENT BROADLY

The process according to this invention generally involves reacting a hydroxyl group containing dextran substance in aqueous solution in the presence of an alkaline reacting catalyst with a bifunctional organic substance capable of reacting with the hydroxyl groups of the dextran substance which results in the formation of a copolymerizate in the form of a gel containing the molecules of the dextran substance bound together by ether bridges of the type —R—O—X—O—R— wherein R represents the molecules of the dextran substance and X is an aliphatic radical obtained from the bifunctional substance containing from about 3 to 10 carbon atoms.

THE HYDROXYL GROUP CONTAINING DEXTRAN SUBSTANCE

The term "dextran substances" as used in the present specification and in the appended claims is intended to encompass polymers of dextran having an average molecular weight ranging from 1000 up to several millions, or even hundreds of millions and consisting of glucose residues bonded together by mainly alpha-1,6-glycoside linkages. Thus, for example, suitable dextran substances for the reaction of the present invention would include native dextran or partially depolymerized dextran obtained by hydrolysis of native dextran, or hydrophilic hydroxyl group-containing derivatives of dextran, or neutral hydroxyl group-containing hydrophilic derivatives of dextran or partially depolymerized dextran, such as ethyl, hydroxyethyl or 2-hydroxypropyl ethers of dextran, or dextran glycerine glucoside, or hydrodextran (i.e. dextran, the reducing end groups of which have been reduced to alcohol groups), or hydroxyl group-containing hydrophilic derivatives of dextran or partially depolymerized dextran containing acid or basic groups, for example, carboxyl groups, sulphonic acid groups, or amino groups or substituted amino groups, such as carboxymethyldextran or dextran, the end groups of which are oxidized to carboxyl groups. Often fractions of the above-mentioned dextran substances may also advantageously be used.

THE BIFUNCTIONAL ORGANIC SUBSTANCE

Suitable bifunctional substances for carrying out the process of this invention may be selected from bifunctional glycerine derivatives such as epichlorohydrin, dichlorohydrin, 1,2,3,4-diepoxybutane, bis-epoxypropyl ether, ethylene glycol-bis-epoxypropyl ether and 1,4-butanediol-bis-epoxypropyl ether and closely related compounds.

THE AQUEOUS MEDIUM AND THE REACTION CATALYST

The reaction is carried out in aqueous solution and in the presence of an alkaline reacting substance having a catalyzing effect on the reaction. Examples of suitable catalysts are the alkali metal hydroxides, preferably sodium hydroxide, and the alkaline earth metal hydroxides, and also tertiary and quaternary amines. If halogen hydrines are used as bifunctional organic substances, the alkali or alkaline compound should preferably also serve to neutralize the hydrogen halide split off in the reaction, and for this purpose the amount of the alkaline compound should be greater than that which would otherwise be required for the reaction so as to maintain a pH above 7 in the reaction mixture.

REACTION TEMPERATURES AND TIMES

The reaction temperature may be varied within wide limits and as a consequence the reaction time will be dependent to a certain extent on the reaction temperature which has been chosen. With regard to the speed of reaction it is advisable to not work at too low a temperature. However, on the other hand, in order to avoid undesirable side reactions, the temperature should not be too high, and in certain instances it may be desirable to utilize cooling means to control the temperature of the reaction. With due consideration to these circumstances, it is preferred to carry out the reaction at a temperature between about 15° C. and 60–90° C., preferably within the range of 30–70° C. However, it is conceivable that higher or lower temperatures could be used under certain circumstances.

Depending on the reaction temperature, the reaction medium, the reaction temperature, etc., the formation of a gel copolymerizate usually takes place in a matter of hours, for example, from about 2 to 4 hours, or in some instances even sooner.

THE AMOUNTS OF THE REACTANTS AND THE MIXING THEREOF

The concentration of the dextran substance in said aqueous solution may suitably be within the range of from about 10% to about 70% by weight. The aqueous solution of the dextran substance should preferably have a viscosity of at least 50 cp., and preferably about 100 cp. (measured at a temperature of 25° C.). The molecular proportions of the dextran substance to the bifunctional substance should be 1: at least 10.

The reaction is preferably carried out by mixing all of the reactants together at once, but it is also possible to carry out the reaction in steps, for example in such a way that the dextran substance is caused to react with amounts of the bifunctional substance which are added successively stepwise, whereby the average molecular weight of the product is increased in steps. This manner of working may be suitable when it is desired to subject the product to an intermediate purifying treatment before gel formation.

CURING AND TREATING THE GEL

The aforesaid gel copolymerizate is preferably subjected to a curing step and although the curing conditions are not critical, they are preferably carried out at an elevated temperature within the range of about 30°–90° C. and for a time generally within the range of 5 to 48 hours, to complete the reaction. After curing, the gel copolymerizates obtained in the reaction are preferably ground to a suitable particle size, neutralized and subjected to a purification by washing. The particle size should be such that the purification is not rendered difficult due to the fact that the diffusion equilibrium is reached too slowly. For this purpose it has been found suitable to grind the gels to an average particle diameter within the range of about 0.01 to 2.0 millimeters. The purification may then be effected on a filter or in a centrifuge or the like by washing with water or organic solvents. It is important that some water be present, since when the gel is in a completely unswollen state it often traps and encloses impurities mechanically, whereas when the gel swells under the influence of water, these impurities can pass out of the gel particles by diffusion.

CHEMICAL PROPERTIES OF THE REACTION PRODUCT

As indicated above, the copolymerization gel product obtained during the reaction contains the molecules of the dextran substance bound together by ether bridges which are of the common type —R—O—X—O—R—, wherein R represents the radicals or residues of the molecules of the dextran substance and X is the aliphatic radical from the bifunctional substance. If a bifunctional glycerine derivative is used, for example epichlorohydrin, the bridge will be the type

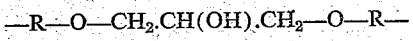

—R—O—CH$_2$.CH(OH).CH$_2$—O—R— where the radical X contains 3 carbon atoms.

The gels obtained in this way consist of three dimensional networks of macroscopic dimensions of the molecules of the dextran substance, built up of chains of mainly alpha-1,6-glucosidically bonded glucose residues, bonded together by ether bridges of the above-mentioned general type —R—O—X—O—R—, wherein R represents the dextran substances and X is the aliphatic radical in the ether bridge, said aliphatic radical X containing from 3 to 10 carbon atoms.

The structure of such a three dimensional copolymerizate is illustrated in the drawing which shows three chains of dextran substances bonded together by three ether bridges produced from epichlorohydrin, the radical X in said ether bridges containing 3 carbon atoms.

The said gel products are insoluble in water but capable of swelling therein due to the presence of hydroxyl groups. The capacity of swelling of the gel product so obtained may be expressed by the amount of water in grams which can be absorbed by 1 g. of the dry gel, which is also known as the "water regain." The water regain for the products produced according to the invention may be from about 1 to 50 g./g. of the dry gel product, but is generally within the range of about 1 to 30 g./g. of dry gel product.

USES OF THE REACTION PRODUCT

Aside from its obvious use as a desiccant, the gel polymerizates manufactured in accordance with this invention have proved to be extremely valuable for separation of substances of different molecular dimensions by the so-called molecular sieving techniques, for which purpose they may be used in grain sizes having an average diameter within the range of about 0.01–2.0 mm. As an example of this use of the gels may be mentioned the separation of solutes of colloids from solutes of crystalloids from a solution. The gels may also be used as base substances for the manufacture of ion exchangers. Further, when they contain acid or basic groups, for example carboxyl groups, sulphonic acid groups or amino groups, they may directly be used as ion exchangers with valuable properties. Other purposes of utilization are as disintegrating agents for tablets, as water-keeping laxatives and as fillers in pharmaceutical, rubber, plastic and chemotechnical preparations.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature, and the pressure is atmospheric, unless otherwise indicated. The aqueous solution of sodium hydroxide is one normal, unless otherwise indicated. The molecular weight ($M_w$) are average molecular weights, unless otherwise specified.

Example 1

500 g. of dextran having an average molecular weight of 40,000 were dissolved in 1170 ml. of an aqueous solution of sodium hydroxide and 100 g. of epichlorohydrin were then added thereto. After the reaction had proceeded for about 2 hours at 45° C. a gel had been formed which was cured by heating to 45° C. for an additional 24 hours. The product was ground to a particle size ranging between about 50 and 200 mesh and was then neutralized with hydrochloric acid, washed on a filter with water until salt-free and then dried to constant weight in an oven at about 80° C. 560 g. of a product with a "water regain" of 5 g./g. dry product were obtained.

Example 2

500 g. of dextran ($M_w$—40,000) were dissolved in 2000 ml. of an aqueous solution of sodium hydroxide and 100 g. of epichlorohydrin were added thereto. After 4 hours at 45° C. a gel had been formed which was cured by heating to 45° C. for 24 hours. After grinding, neutralizing, washing and drying, substantially as in Example 1, 360 g. of a product with a "water regain" of 13 g./g. of the dry product were obtained.

Example 3

500 g. of dextran ($M_w$)—40,000) were dissolved in 2000 ml. of an aqueous solution of sodium hydroxide and 185 g. of epichlorohydrin were then added thereto. After 2 hours at 45° C. a gel had been formed which was cured by heating to 45° C. for 24 hours. After grinding, neutralization, washing and drying, substantially as in Example 1, 574 g. of a product having a water regain of 7 g./g. of the dry product were obtained.

Example 4

500 g. of dextran ($M_w$—1,800,000) were dissolved in 2000 ml. of an aqueous solution of sodium hydroxide and 100 g. of epichlorohydrin were then added thereto. After 1 hour at 45° C. a gel had been formed which was cured by heating to 45° for 24 hours. After grinding, neutralization, washing and drying, substantially as in Example 1, 540 g. of a product with a water regain of 10 g./g. of the dry product were obtained.

Example 5

100 g. of dextran ($M_w$=1,800,000) were dissolved in 2000 ml. of an aqueous 0.5 n solution of sodium hydroxide and 100 g. of epichlorohydrin were added thereto. The mixture was heated for 8 hours at 55° C. A gel was thereby formed. After grinding, neutralization, washing and drying, substantially as in Example 1, 60 g. of a product with a water regain of 50 g./g. of the dry product were obtained.

Example 6

120 g. of dextran ($M_w$=5000) were dissolved in 80 ml. of an aqueous 5 n solution of sodium hydroxide and 24 g. of epichlorohydrin were added thereto. After 24 hours at room temperature the mass had solidified to a gel which was cured by heating to 40° C. for 24 hours. After grinding, neutralization, washing and drying, substantially as in Example 1, 74 g. of a product with a water regain of 9 g./g. of the dry product were obtained.

Example 7

1 kg. of dextran ($M_w$=40,000) were dissolved in 1 liter of an aqueous 4 n solution of sodium hydroxide and 550 g. of epichlorohydrin were added thereto. The temperature rapidly rose to 70° C. and this temperature was maintained for 24 hours. After grinding, neutralization, washing and drying, substantially as in Example 1, 1.1 kg. of a product with a water regain of 1.8 g./g. of the dry product were obtained. The product was fractionated into two fractions. The main fraction, 700 g., had a particle size within the range of about 0.1–0.3 mm., the other fraction, 400 g., a particle size within the range of about 0.01–0.1 mm.

*Example 8*

To a solution of 20 g. of dextran ($M_w=40,000$) in 80 ml. of water there was added 0.5 ml. of an aqueous 5 n solution of sodium hydroxide and 17 g. of ethylene glycol-bis-epoxypropylether. The mixture was heated for 24 hours at about 70° C. After 2 hours a gel had been formed. After grinding, neutralizing, washing and drying, substantially as an Example 1, 28 g. of a product having a water regain of 3.5 g./g. were obtained. The main fraction had a particle size within the range of about 0.3 to 2 mm.

*Example 9*

100 g. of dextran ($M_w=1,800,000$) were dissolved in 500 ml. of an aqueous 2 n solution of potassium hydroxide and 30 g. of glycerine-1,3-dichlorohydrin were added at room temperature. After 15 minutes a gel had been formed. After curing for 5 hours, the gel was treated substantially as in Example 1.

*Example 10*

60 g. of dextran ($M_w=40,000$) were dissolved in 140 ml. of water, whereupon 50 g. of solid calcium hydroxide and 25 g. of epichlorohydrin were added thereto. After 2 hours at room temperature a gel had been formed. It was cured by heating to 60° C. for 72 hours. After grinding, neutralizing, washing and drying, substantially as in Example 1, 68 g. of a product with a water regain of 3.9 g./g. of the dry product were obtained.

*Example 11*

25 g. of sodiumcarboxymethyldextran ($M_w=40,000$) were dissolved in 25 ml. of an aqueous 2 n solution of sodium hydroxide and 5 g. of epichlorohydrin were added thereto. After 1 hour at room temperature a gel had been formed. It was cured at 60° C. for 48 hours. The water regain of the product so obtained was 3.2 g./g. of the dry product.

*Example 12*

40 g. of 2-hydroxypropyldextran ($M_w=40,000$) were dissolved in 40 ml. of an aqueous 2 n solution of NaOH, and 8 g. of epichlorohydrin were added thereto. The solution was left to stand at room temperature overnight and a gel was thereby formed. It was cured at 60° C. for 48 hours. The water regain of the product so obtained was 8 g./g. of the dry product.

*Example 13*

50 g. of hydrodextran ($M_w=40,000$) were dissolved in 50 ml. of an aqueous 2 n solution of sodium hydroxide, and 8.9 g. of epichlorohydrin were added thereto. After 2 hours at room temperature a gel had been formed. It was cured at 45° C. for 72 hours. After grinding, neutralizing, washing and drying, substantially as in Example 1, 56 g. of a product with a water regain of 3.2 g./g. of the dry product were obtained.

*Example 14*

50 g. of dextrangycerineglycosid ($M_w=80,000$) were dissolved in 50 ml. of an aqueous 2 n solution of sodium hydroxide and 10 g. of epichlorohydrin were added thereto. After 2 hours a gel had been formed, which was cured for 20 hours at 45° C. and then treated substantially as in Example 1.

*Example 15*

200 g. of dextran ($M_w=40,000$) were dissolved in 200 ml. of an aqueous 4 n solution of sodium hydroxide and 100 g. of 1,4-butandiol-bis-epoxypropyl ether were added thereto. After 3 hours at room temperature a gel had been formed which was cured by heating to 60° C. for 24 hours. After grinding, neutralization, washing and drying similarly as in Example 1, 260 g. of a product with a water regain of 1.9 g. per g. of dry product were obtained.

*Example 16*

25 g. of dextran ($M_w=40,000$) were dissolved in 25 ml. of an aqueous 4 n solution of sodium hydroxide and 7.3 g. of 1,2,3,4-diepoxybutan were added thereto. After 10 minutes at room temperature a gel was formed. After the heat evolution had ceased, the product was cured at 60° C. for 24 hours. After grinding, neutralization, washing and drying, similarly as in Example 1, 27 g. of a product with a water regain of 2.7 g./g. of the dry product were obtained.

*Example 17*

53.5 g. of dextran ($M_w=40,000$) were dissolved in 50 ml. of an aqueous 2 n solution of sodium hydroxide and 15 g. of bisepoxypropyl ether were added thereto. The polymerisation was started at room temperature. After 1 hour a gel had been formed which was cured at 50° C. for 24 hours. After grinding, neutralizing, washing and drying, similarly as stated in Example 1, 63 g. of a product with the water regain 1.6 g./g. of the dry product were obtained.

MISCELLANEOUS

Those skilled in the chemical arts and particularly in the art to which this invention pertains will readily appreciate that many modifications of the basic invention set forth here are possible. For example, it is quite possible that other closely related compounds and reaction conditions might work as well as the herein specifically described compounds and reaction conditions, and there would certainly be no invention involved in trying such closely related compounds and reaction conditions in view of the present broad disclosure. All of these modifications are considered to be within the scope of the present claims by virtue of the well-established "doctrine of equivalents."

What is claimed is:

1. As a product, a copolymerization product in gel grain form comprising a three-dimensional macroscopic network of dextran substances, built up of chains of mainly alpha-1,6-glucosidically bonded glucose residues, bonded together by ether bridges of the general type —R—O—X—O—R—, wherein R represents the dextran substances and X is an aliphatic radical containing from 3 to 10 carbon atoms, the said copolymerization product being water-insolube but being capable of absorbing water with swelling, the water regain of the product being within the range of about 1 to 50 g./g. of the dry gel product.

2. As a product, suitable for separating solutes with different molecular sizes from a solution by "molecular sieving" techniques, a copolymerization product in the form of gel grains having an average diameter within the range of about 0.01 to 2.0 mm. and consisting of a three-dimensional macroscopic network of dextran substances, built up of chains of mainly alpha-1,6-glucosidically bonded glucose residues, bonded together by ether bridges of the general type —R—O—X—O—R—, wherein R represents the dextran substances and X is an aliphatic radical containing from 3 to 10 carbon atoms, the said gel grains being water-insoluble but capable of absorbing water with swelling, the water regain of the product being within the range of about 1 to 50 g./g. of the dry gel product.

3. The process, which comprises reacting an aqueous solution of 10 to 70% by weight of a hydroxyl group-containing dextran substance with a bifunctional organic substance capable of reacting with the hydroxyl groups of the dextran substance, in the ratio of at least 10 molecules of the bifunctional substance per molecule of the dextran substance, in the presence of an alkaline reacting substance as catalyst, the said bifunctional organic substance being selected from the group consisting of epichlorohydrin, dichlorohydrin, diepoxybutane, bis-epoxypropyl ether, ethyleneglycol-bis-epoxypropyl ether and 1,4-butane-diol-bis-epoxypropyl ether, carrying out the reaction at a temperature between about 15° C. and about 90° C. and thereby forming a gel, subjecting said gel to heat treatment at an elevated temperature not exceeding 90° C., and recovering the resultant gel product.

4. The process of claim 3, wherein the catalyst consists of an alkali metal hydroxide.

5. The process of claim 3 wherein the gel product is granulated down to an average particle size within the range 0.01 to 2.0 mm.

6. The process which comprises reacting an aqueous solution of 10 to 70% by weight of a hydroxyl group-containing dextran substance with an aliphatic epoxy compound capable of reacting with the hydroxyl groups of the dextran substance with the formation of ether bridges between the dextran molecules, in the ratio of at least 10 molecules of the epoxy compound per molecule of the dextran substance, in the presence of sodium hydroxide as catalyst, the said epoxy compound being selected from the group consisting of epichlorohydrin, dichlorohydrin, diepoxybutane, bis-epoxypropyl ether, ethyleneglycol-bis-epoxypropyl ether and 1,4-butane-diol-bis-epoxypropyl ether, carrying out the reaction at a temperature between about 15° C. and about 90° C. and thereby forming a gel, completing the reaction by subjecting said gel to heat treatment at a temperature of from 30 to 90° C., granulating the gel down to an average particle size within the range of about 0.01 to 2.0 mm., neutralizing and washing the granulated product, and recovering the resultant gel grains.

7. The process of claim 6, wherein the hydroxyl group-containing dextran substance has an average molecular weight between about 5000 and about 1,800,000.

8. The process of claim 6, wherein the hydroxyl group-containing dextran substance has an average molecular weight of about 40,000.

References Cited in the file of this patent
UNITED STATES PATENTS
2,671,799    Gaver et al. _____ Mar. 9, 1954